(12) United States Patent
Ait-Ameur (10) Patent No.: US 8,655,326 B2
(45) Date of Patent: Feb. 18, 2014

(54) WIRELESS HANDSET CONNECTIVITY TIME OPTIMIZATION

(75) Inventor: Samir Ait-Ameur, Fremont, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 774 days.

(21) Appl. No.: 12/540,922

(22) Filed: Aug. 13, 2009

(65) Prior Publication Data

US 2011/0039526 A1 Feb. 17, 2011

(51) Int. Cl.
- *H04M 3/42* (2006.01)
- *H04M 3/00* (2006.01)
- *G06F 15/16* (2006.01)

(52) U.S. Cl.
USPC ......... 455/414.1; 455/418; 709/229; 709/203

(58) Field of Classification Search
USPC ......... 455/414.1, 418; 709/229, 203; 713/201
See application file for complete search history.

(56) References Cited

U.S. PATENT DOCUMENTS

| | | | | |
|---|---|---|---|---|
| 2002/0059436 | A1* | 5/2002 | Kubo | 709/229 |
| 2003/0188188 | A1* | 10/2003 | Padmanabhan et al. | 713/201 |
| 2004/0199646 | A1* | 10/2004 | Susai et al. | 709/227 |
| 2007/0140193 | A1* | 6/2007 | Dosa et al. | 370/338 |
| 2010/0228863 | A1* | 9/2010 | Kawauchi | 709/227 |

* cited by examiner

*Primary Examiner* — Ariel Balaoing (57) ABSTRACT

A system includes a user device configured to communicate with an application server over a network. A plurality of network elements are in communication with one another over the network, and each of the plurality of network elements have at least one parameter representative of network behavior. An adaptive server is in communication with the user device, the application server, and at least one of the network elements. The adaptive server is configured to estimate a connectivity time with the application server based on the parameter.

29 Claims, 6 Drawing Sheets

WIRELESS HANDSET CONNECTIVITY TIME OPTIMIZATION

BACKGROUND

Many service providers allow users of mobile devices to access applications over a network. The user device must connect to an application server hosting the application. The application server is configured with a predetermined connection time. However, due to network congestion, it may take the mobile device several attempts to connect to the application server. Each failed attempt generates a flow record that is transmitted to an accounting server. However, generating and storing the flow record uses valuable network resources, contributing to the problem the flow record is intended to document. Therefore, a system is needed that reduces the number of failed connection attempts, thereby reducing the overall number of flow records. However, some flow records provide the system with valuable information. Thus, if a flow record is created, a system is needed to reduce the impact that generating and storing the flow record has on the network resources.

DETAILED DESCRIPTION

An exemplary system includes a user device configured to communicate with an application server over a network. The user device may connect to the application server, and the time required for the user device to connect to the application server may be known as a connectivity time. Connectivity time may be affected by network behavior, such as network congestion. A plurality of network elements are in communication with one another over the network, and each of the network elements have at least one parameter representative of network behavior. For example, the parameter may include or indicate bit rate, packet loss, queue delay, jitter, out of order delivery, packet delivery errors, hop count, latencies, interdependencies between elements, service priority, etc. An adaptive server is in communication with the user device, the application server, and at least one of the network elements. The adaptive server is configured to predict the network behavior based on the at least one parameter of at least one of the network elements. The adaptive server is further configured to negotiate a connectivity time with the application server based on the predicted network behavior.

The adaptive server may include, for example, an estimator module in communication with at least one of the network elements and configured to receive at least one parameter from one or more of the network elements. The estimator module may further be configured to estimate the connectivity time based on one or more parameters. Therefore, instead of being a predetermined value, the estimated connectivity time is based on real-time network behavior. For example, during times with high network congestion, the estimated connectivity time may be longer than a predetermined connectivity time, giving the user device a longer time to connect to the application server. The adaptive server may communicate the estimated connectivity time to the application server, and in response, instead of applying the predetermined connectivity time, the application server allows the user device the estimated connectivity time to connect. Because the estimated connectivity time is based on real-time network behavior, the number of failed attempts is reduced. With fewer failed connection attempts, fewer flow records are generated.

Figure 1:
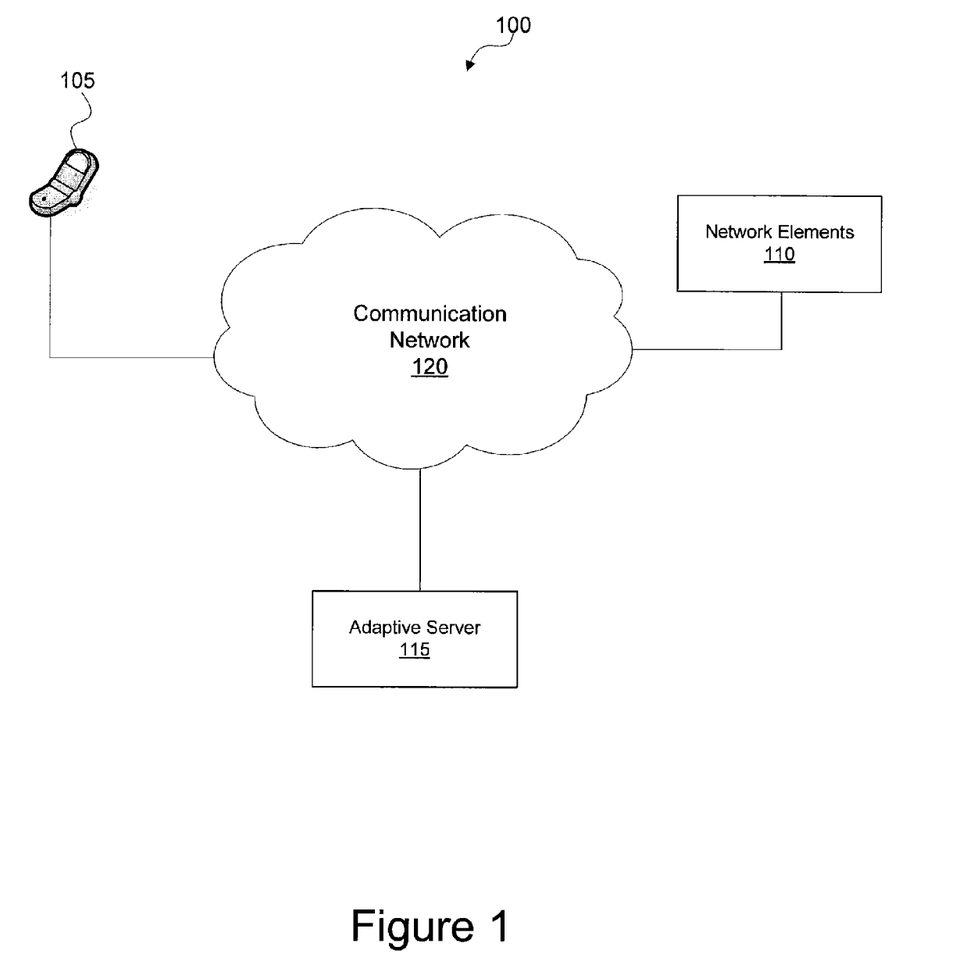
FIG. 1 illustrates an exemplary system where a user device communicates with an adaptive server over a network.

FIG. 1 illustrates an exemplary system 100 having a user device 105 configured to communicate with a plurality of network elements 110 and an adaptive server 115 over a network 120. The system 100 may implement any of a variety of devices that may be used by a subscriber to send and receive communications (such as voice, text, image, video, binary data, etc.) over the communications network 120. Exemplary communications networks may include a mixture of wired (e.g., fiber and copper) and wireless mechanisms that incorporate related infrastructure and accompanying network elements. Illustrative communication networks include a Public Switched Telephone Network (PSTN), a Voice over Internet Protocol (VOIP) network or a cellular telephone network. The communications network 120 may include multiple interconnected networks that provide communications services, including voice calling, packet-switched network services (including, for example, Internet access and/or VOIP communication services), as well as Short Message Service (SMS) messaging and Multimedia Messaging Service (MMS) messaging services, to at least one subscriber device.

The user device 105 may include any one of a number of well known computing devices, including, without limitation, a cellular telephone, personal digital assistant, a computer workstation, a desktop, notebook, laptop, or handheld computer, a Plain Old Telephone Service (POTS) telephone, Voice Over Internet Protocol (VOIP) telephone, a mobile device such as a "smart" phone, personal digital assistant mobile telephone, a "softphone," pager, computer, and Set Top Box (STB), or any other device configured to make telephone calls and/or transmit data over the network, including, for example, by communicating with one or more of the network elements 110 over the communication network 120. The user device 105 may include hardware, software, or a combination of hardware and software that allows the user device 105 to communicate over the network. The user device 105 may include any number of applications, such as an email application, a text messaging application (e.g., a short message service (SMS) or multimedia messaging service (MMS)), a voicemail application, a navigator, a global positioning system (GPS), etc. The user device 105 may communicate with other network elements in a wired or wireless manner, depending on the communications network and the characteristics of the user device.

Figure 2:
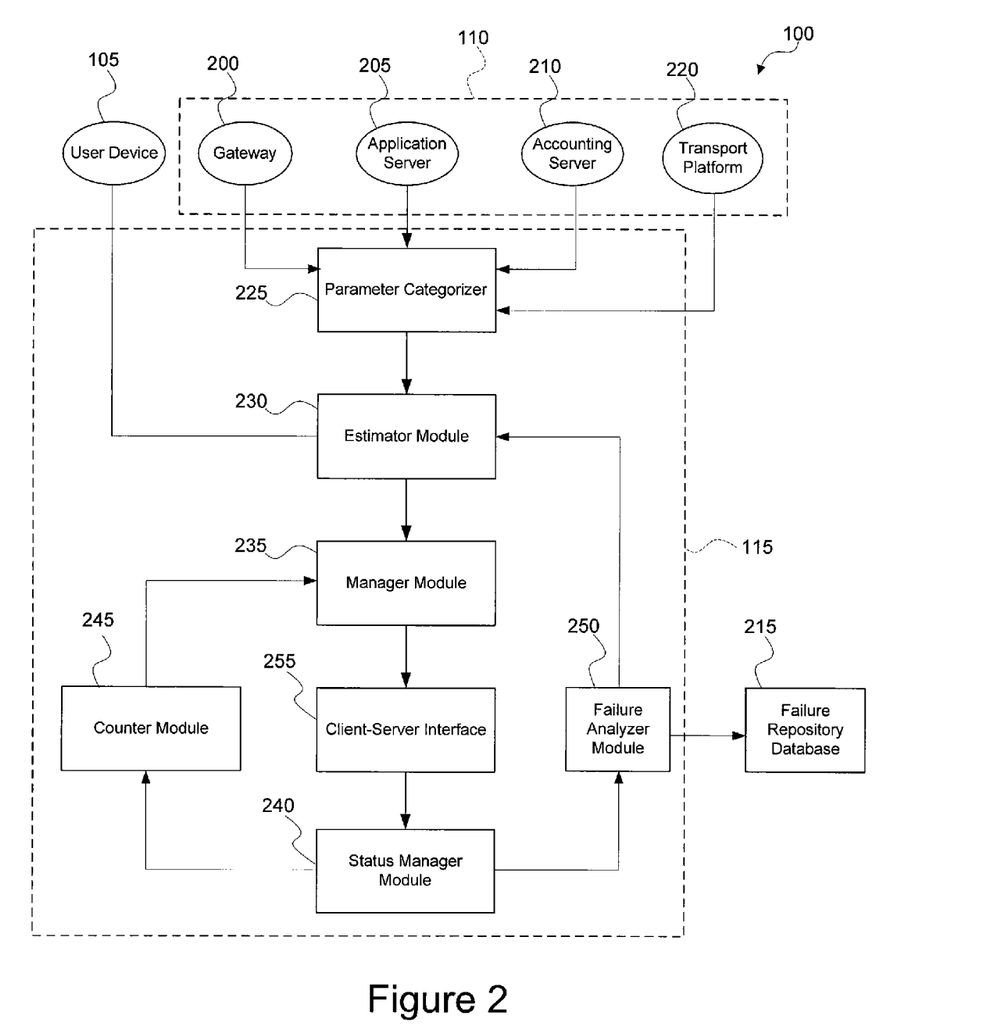
FIG. 2 illustrates an exemplary system wherein the adaptive server is configured to predict network behavior and negotiate a connectivity time with an application server.

The network elements 110 and adaptive server 115 will now be explained in more detail with reference to FIG. 2. The network elements 110 may include any number of components including a default packet gateway 200, an application server 205, an accounting server 210, and a failure repository database 215. Each of the network elements 110 is configured to receive or transmit information from one network element 110 to another. Further, each network element 110 has various parameters that may be communicated. The network parameters may include information that is indicative of network behavior, such as network congestion, quality of service, bandwidth usage, and the like. For example, the parameter may include or indicate bit rate, packet loss, queue delay, jitter, out of order delivery, packet delivery errors, hop count, latencies, inter-dependencies between elements, service priority, etc. However, each network element 110 may have other parameters indicative of other types of network behavior. Each network element 110 may include hardware, software, or a combination of both configured to measure and communicate one or more of the parameters to the adaptive server 115.

The gateway 200 may include one or more nodes that interface with other network elements 110 and may operate using a different network protocol. In a packet-switching network, for example, the gateway 200 may include a default packet gateway 200 configured to receive packets transmitted using one protocol and output the packets under a different protocol.

The application server 205 may be operated by a service provider of the user device 105 or a third party and may be configured to host one or more applications that may be used with or by the user device 105. For example, the application server 205 may host email, voicemail, text messaging, etc. for the user device 105. The application server 205 may include one or more application databases with information related to the application hosted for user device 105. If the application server 205 hosts the email application, the application database may store emails, contact information, etc., and transmit the emails and contact information to the user device 105 automatically or in response to a user of the user device 105 requesting the emails or contact information.

The accounting server 210 may be configured to receive records generated with regard to the user device 105. The accounting server 210 may further store flow records pertaining to billing or troubleshooting. The flow records may be stored in one or more databases and be accessible by a person or a computing device. In one exemplary approach, the accounting server 210 may be hosted by a service provider for the user device 105 or a third party.

The failure repository database 215 may be configured to receive flow records documenting failed connection attempts between the user device 105 and the application server 205.

Databases, data repositories or other data stores described herein, such as the service failure repository database 215 or the databases associated with the accounting server 205 and/or the application server 205, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

Other network elements 110 may include a transport platform 220 such as a wireless transport platform, an IP transport platform, or possibly both types of transports mechanisms combined together within transport platform 220. For example, the transport platform 220 may include hardware, software or a combination of hardware and software implementing at least one approach for transmitting data to the various network elements. The approach may incorporate, for example, a combination of methods or protocols.

The adaptive server 115 may include multiple sub-components including, but not limited to, a parameter categorizer 225, an estimator module 230, a manager module 235, a status manager module 240, a counter module 245, a service failure analyzer module 250, and a client-server interface 255 that may be implemented using hardware, software, or a combination of hardware and software. Moreover, one or more of the components of the adaptive server 115 may be located in a server remote from one or more of the other sub-components.

The parameter categorizer 225 may be in communication with one or more of the network elements 110 and be configured to receive at least one parameter from the network elements 110 and organize the parameters based on category. For example, the categorizer 225 may be configured to receive parameters from each network element 110 indicating network congestion and quality of service. The categorizer 225 may group the parameters relating to network congestion together, and group the parameters relating to quality of service together.

The estimator module 230 may be in communication with the categorizer 225 to, for example, receive the parameters from each of the network elements 110. The estimator module 230 may be configured to estimate a connectivity time as discussed in greater detail below with respect to FIGS. 3A-3C and FIG. 4.

The manager module 235 may be in communication with the estimator module 230 and configured to prioritize connections to the application server 205 based on the estimated connectivity time received from said estimator module 230.

The status manager module 240 may be in communication with the manager module 235 and configured to log successful and failed connection attempts to the application server 205. The status manager module 240 may be configured to communicate with the application server 205 via the client-server interface 255.

The counter module 245 may be in communication with the manager module 235 and the status manager module 240 and configured to count a number of failed connection attempts with the application server 205.

The failure analyzer module 250 may be in communication with the estimator module 230 and the status manager module 240. The failure analyzer module 250 may be configured to log a failed connectivity attempt and identify a cause of the failed connection attempt as discussed in greater detail below. Moreover, the failure analyzer module 250 may be configured to communicate the cause of the failed connection attempt to the estimator module 230.

The client-server interface 255 may be in communication with the manager module 235 and the status manager module 240. The client-server interface 255 may be hardware, software, or a combination of both that allows the adaptive server 115 to communicate with various servers, including the application server 205, the accounting server 210, and a server hosting the failure repository database 215.

In general, the user device 105, the gateway 200, the application server 205, the accounting server 205, and the adaptive server 115 may employ any of a number of well known computer operating systems, including, but by no means limited to, known versions and/or varieties of mobile operating systems, the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system.

The user device 105, the application server 205, the accounting server 205, and the adaptive server 115 may further include instructions executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any tangible medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements and/or modules may be tangibly implemented as computer-readable instructions (e.g., software) on one or more computing devices (e.g., the user device 105, the adaptive server 115, the application server 205, the accounting server 210, etc.), and stored on computer readable media associated therewith (e.g., disks, memories, etc.).

The application server 205 may be configured to connect and transmit information to the user device 105. Upon request, the application server 205 may wait an amount of time for the user device 105 to connect. This amount of time may be known as the connectivity time. If the user device 105 is able to connect to the application server 205 within the connectivity time, a connection is established. If the user device 105 is unable to connect to the application server 205 within the connectivity time, the connection fails (e.g., the application server 205 issues a timeout) and the adaptive server 115 generates a flow record documenting the failed connection attempt. Various process flow diagrams will now be described illustrating exemplary situations.

Figure 3A:
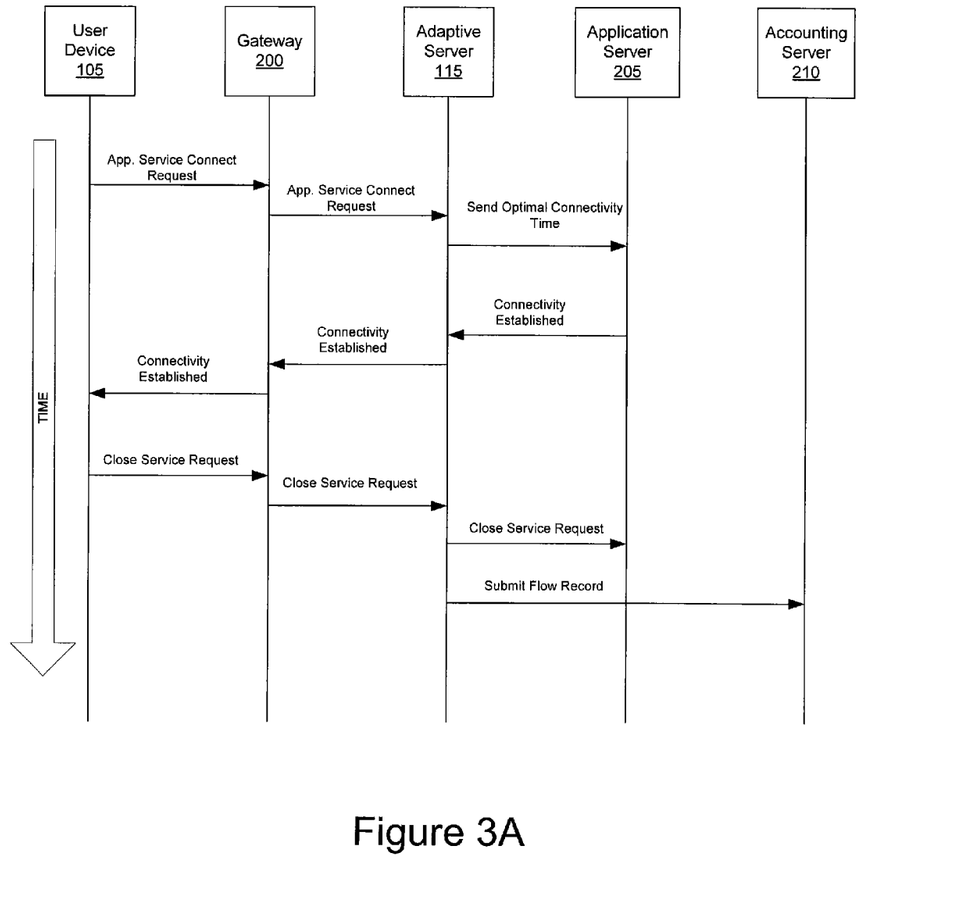
FIGS. 3A-C illustrate exemplary process flow diagrams showing exemplary interactions between various network devices.

FIG. 3A illustrates an exemplary process flow diagram where the user device 105 is able to connect to the application server 205 within the connectivity time. In this process flow diagram, the user device 105 transmits a request to connect to the application server 205. The request may be converted by the gateway 200 in a format in which the adaptive server 115 is able to receive the request. The adaptive server 115 estimates the connectivity time using the parameters and network behavior discussed below with respect to method 400. The adaptive server 115 may send the estimated connectivity time to the application server 205, instructing the application server 205 to hold the connection open for at least the estimated connectivity time. Once connected, the application server 205 confirms the connection, and the confirmation is transmitted back through the adaptive server 115 and the gateway 200 to the user device 105. With the connection, the user device 105 may communicate with the application server 205. Once the user device 105 is finished communicating with the application server 205, the user device 105 transmits a close service request through the gateway 200 and the adaptive server 115 to the application server 205. The adaptive server 115 may then transmit the flow record to the accounting server 205 for billing or troubleshooting purposes.

Figure 3B:
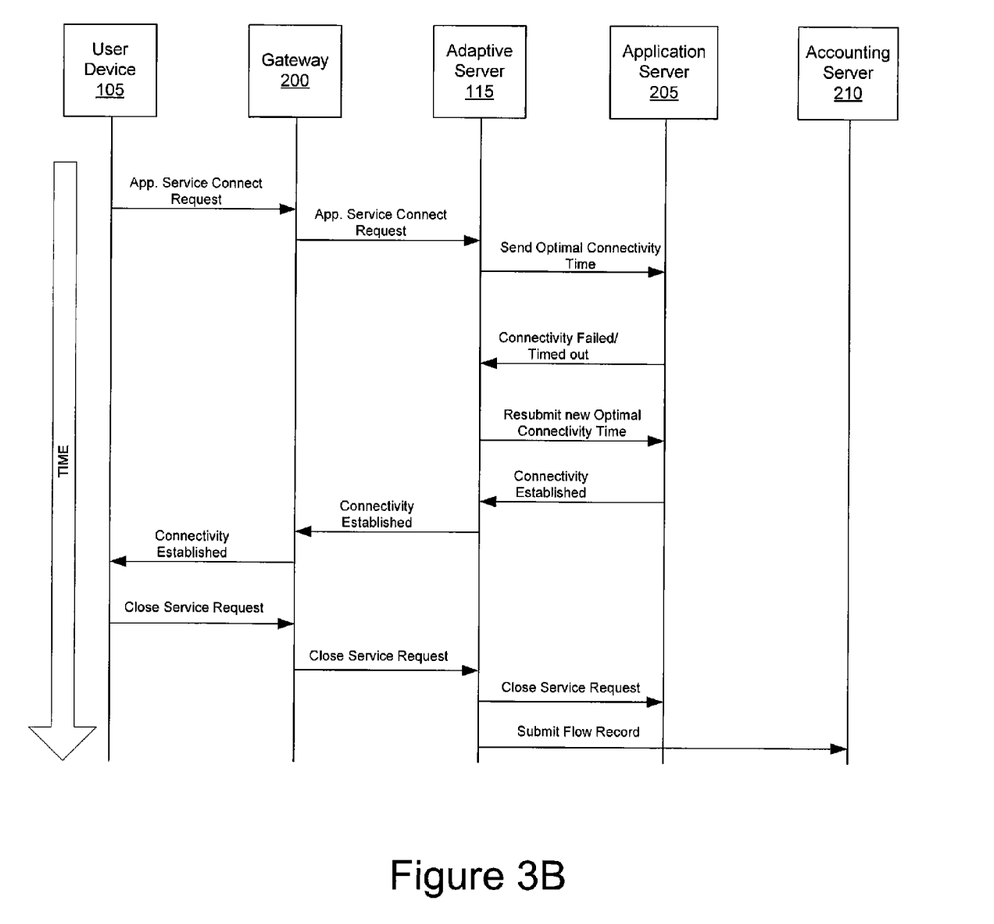

FIG. 3B illustrates another exemplary process flow diagram where application server 205 issues a timeout. In this exemplary illustration, the user device 105 transmits the request to connect to the application server 205. The adaptive server 115 receives the request from the gateway 200 and estimates the connectivity time using the parameters and network behavior as discussed below with respect to method 400. The adaptive server 115 sends the estimated connectivity time to the application server 205. However, the connectivity time is not long enough and the application server 205 issues a timeout and notifies the adaptive server 115. In response, the adaptive server 115 identifies the cause of the failed connection attempt and adjusts the estimated connectivity time accordingly. For example, the failed connection may have been caused by an unexpected increase in network congestion or unscheduled maintenance. Once the adaptive server 115 re-estimates the connectivity time, the user device 105 may again attempt to communicate with the application server 205. When the connection is established, the application server 205 confirms the connection, which is transmitted back through the gateway 200 to the user device 105. When the user device 105 is finished communicating with the application server 205, the user device 105 transmits a close service request through the gateway 200 and the adaptive server 115 to the application server 205. The adaptive server 115 may then transmit the flow record to the accounting server 205 for billing or troubleshooting purposes.

Figure 3C:
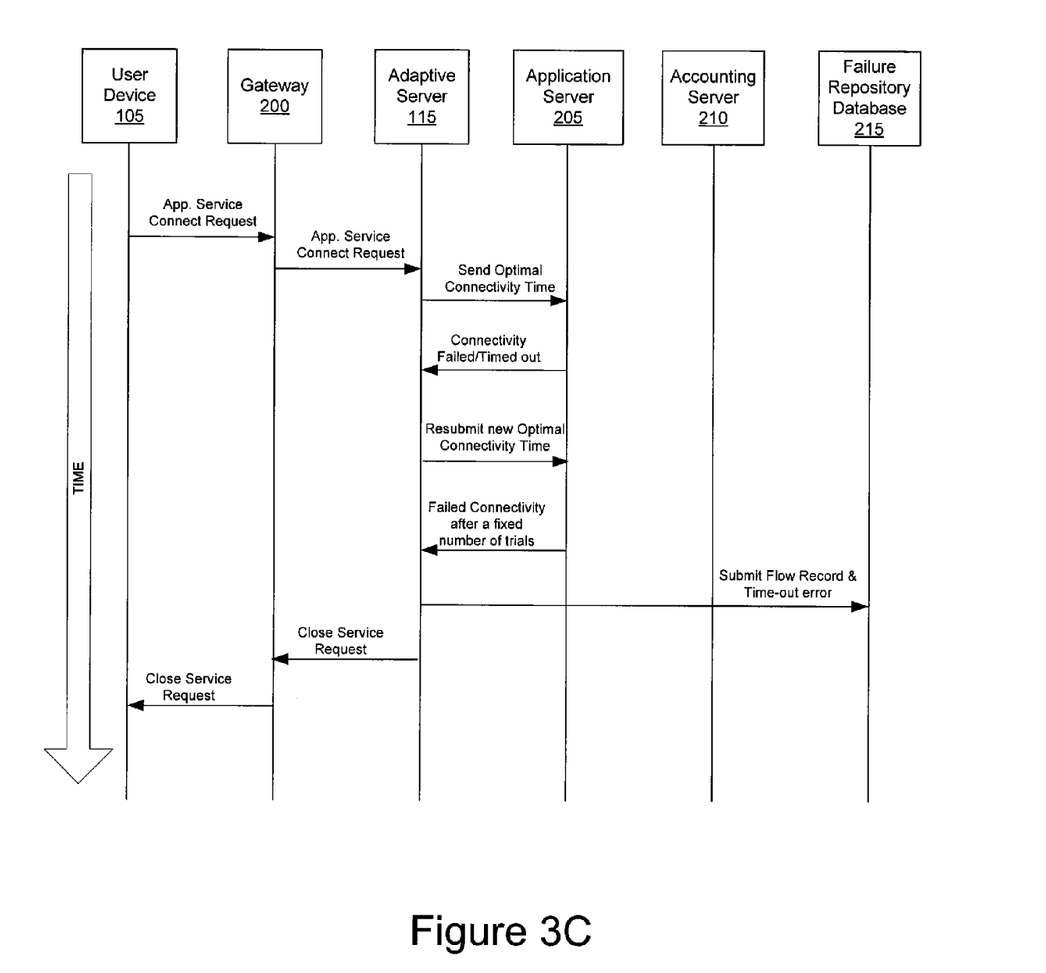

Referring to FIG. 3C, in yet another exemplary illustration, the user device 105 transmits the request to connect to the application server 205. As in the previous flow diagram, the adaptive server 115 receives the request from the gateway 200 and estimates the connectivity time using the parameters and network behavior as discussed below with respect to method 400. The adaptive server 115 sends the estimated connectivity time to the application server 205. However, the connectivity time is not long enough and the application server 205 issues a timeout and notifies the adaptive server 115. In response, the adaptive server 115 adjusts the estimated connectivity time and the user device 105 attempts to connect to the application server 205 again. However, the user device 105 is still unable to establish a connection. The adaptive server 115 transmits the flow record documenting the failed connection attempt to the service failure repository database 215 as well as a close service request through the gateway 200 to the user device 105. The service failure repository database 215 stores each flow record for each failed connection attempt it receives, as well as network parameters that may have contributed to the failed connection attempt. In the future, the adaptive server 115 may access the service failure repository database 215 when predicting future network behavior or estimating future connectivity times. Moreover, sending the flow records of failed connection attempts to the failure repository database 215 reduces the impact that generating and storing the flow record has on the network resources. For example, generating and storing flow records in the failure repository database 215 may reduce network traffic to and from the accounting server 210, making the accounting server 210 more accessible for billing and troubleshooting purposes.

Figure 4:
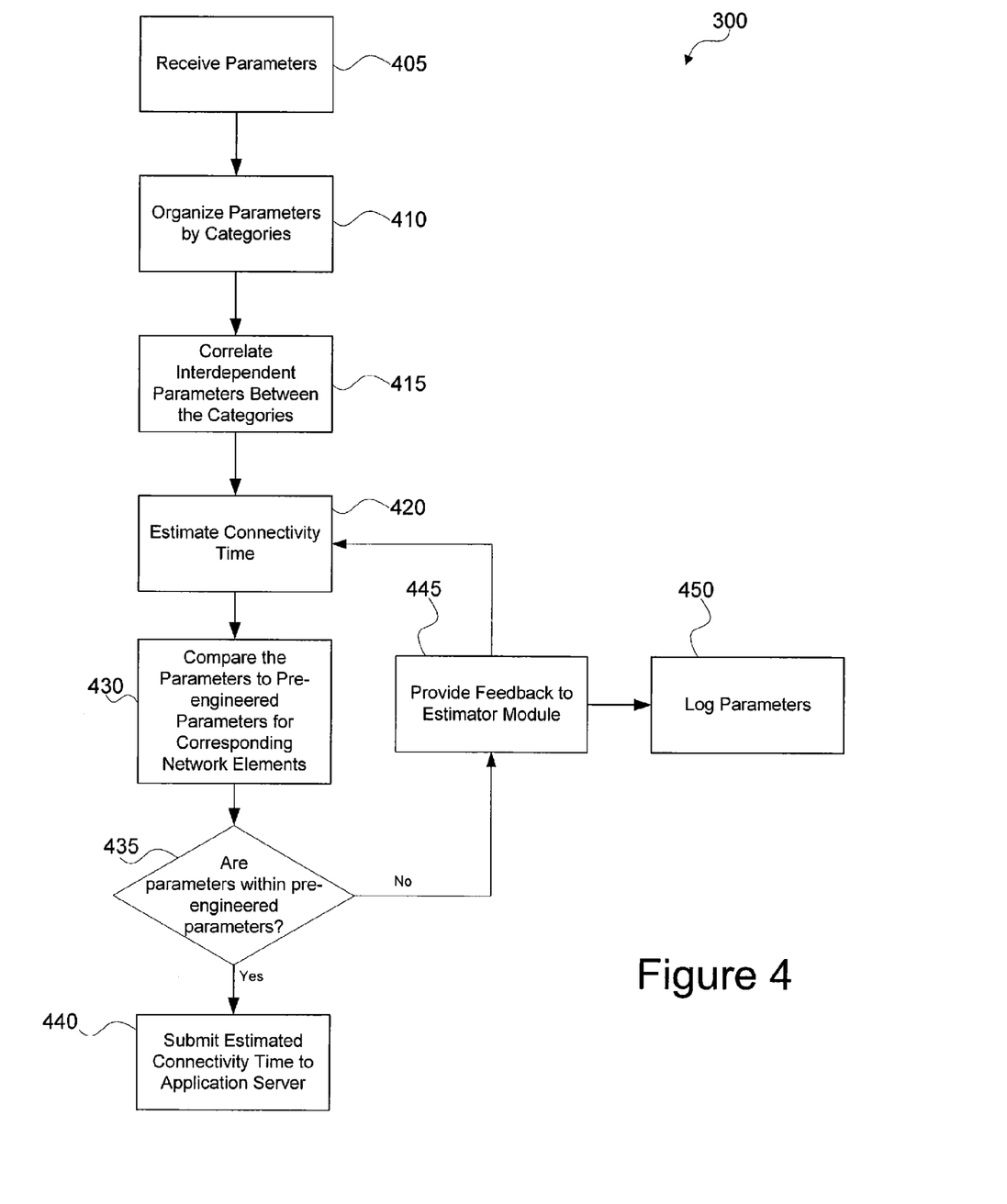
FIG. 4 illustrates a flowchart of an exemplary method performed by the adaptive server.

FIG. 4 illustrates an exemplary method 400 that may be implemented by the adaptive server 115 when receiving the request from the user device 105 to connect to the application server 205. The adaptive server 115 may implement method 400 to estimate the connectivity time based on network behavior, and negotiate the connectivity time with the application server 205 on behalf of the user device 105. Because the connectivity time accounts for network behavior (e.g., high network congestion), a timeout is less likely to occur. By reducing the number of timeouts, fewer flow records may be generated.

Step 405 includes receiving at least one parameter from at least one of the network elements 110. For example, the parameter categorizer 225 may be configured to receive one or more of the parameters and categorize each of the parameters based on how the parameter is indicative of network behavior. In one exemplary approach, the categorizer 225 may receive a value indicating the number of packets lost during transmission from one of the network elements 110. In this exemplary approach, the number of packets lost is the parameter received from the network elements 110. Other parameters may include or indicate bit rate, packet loss, queue delay, jitter, out of order delivery, packet delivery errors, hop count, latencies, inter-dependencies between elements, service priority, etc.

Step 410 includes organizing the parameters based on categories. Continuing with the previous example, the parameter may be packet loss, which the categorizer 225 may recognize as indicative of quality of service and place the value for the packet loss parameter into a "Quality of Service" category. The categorizer 225 may receive additional parameters categorized as "Quality of Service" and group those parameters together. Other parameters in the "Quality of Service" category may include bit rate, delay, jitter, etc. Another category may include "Network Congestion", and parameters indicating network congestion may include queue delay, packet loss, latency, etc. Some parameters in each of the categories may overlap. For instance, some parameters relating to the "Quality of Service" category may also be part of the "Network Congestion" category. Other parameters may not be part of more than one category, but may be used to estimate parameters in another category, which is discussed in step 415 below.

Step 415 includes correlating interdependent parameters between the categories. In one exemplary illustration, the estimator module 230 receives parameters from each of the network elements 110. However, some network elements 110 may output parameters in the "Quality of Service" category while other network elements 110 output parameters in the "Network Congestion" category. Some parameters in the "Quality of Service" category may also be in the "Network Congestion" category. Moreover, some of the "Quality of Service" parameters, for example, may be used to determine the "Network Congestion" parameters. For example, packet loss is a direct indicator of quality of service, while an indirect indicator of network congestion (e.g., packet loss is a result of high network congestion). Therefore, network congestion may be estimated based on the number of packets lost. By correlating interdependent parameters, the estimator module 230 may estimate the connectivity time based on the parameters received, even if the parameters are in different categories using the relationship of the parameters in the different categories to one another.

Step 420 includes estimating the connectivity time based on the parameter received from the network elements 110. For example, the estimator module 230 may implement a heuristic comparing the parameters received to known network behavior. Continuing with the previous exemplary approach, the estimator module 230 is configured to recognize that the parameters are in the "Quality of Service" category, and compare the parameters to predefined quality of service standards to determine the present quality of service standards. The predefined quality of service standards may indicate that quality of service below 60% indicates high network congestion. Therefore, if the parameters received indicate a quality of service below 60%, then the estimator module 230 may recognize high network congestion and estimate a longer connectivity time. Alternatively, the estimator module 230 may receive parameters that allow the estimator module 230 to directly determine network congestion such as bit rate instead of quality of service. For example, the network 120 may allow communication up to a maximum bandwidth of 1 Mbps. If the bit rate indicates that 1 Mbps is being communicated across the network 120, then the estimator module 230 may determine high network congestion and estimate the connectivity time accordingly by, for example, increasing the estimated connectivity time.

Step 430 includes comparing the parameters received to a predetermined parameter range associated with the parameters of each network element 110, and step 435 includes determining whether the parameters are within the predetermined range. Continuing with the previous examples, the predetermined parameter range may indicate the range of values for one or more parameters where the quality of service is above, for example, 60%, or network congestion is below, for example, 80% the maximum bandwidth of the network. When the parameters are within the predetermined parameter range, the estimator module 230 may assume that the network elements 110 are behaving as expected and estimate the connectivity time accordingly. If the network elements 110 are behaving unexpectedly, the estimator module 230 may be configured to adjust the estimated connectivity time. For example, if the parameters indicate that one or more network elements 110 are operating at a very low bandwidth, which may indicate high network congestion, then the estimator module 230 may further compensate by raising the estimated connectivity time even though the quality of service may be at an acceptable level.

If the parameter is within the predetermined range, the method 400 moves to step 440, which includes submitting the estimated connectivity time to the application server 205 to negotiate the connectivity time with the application server 205 on behalf of the user device 105 using, for example, the manager module 235 and the client-server interface 255. The manager module 235 may be configured to prioritize connections from multiple user devices 105 to the application server 205 based on the estimated connectivity time received from the estimator module 230. The manager module 235 may communicate with the application server 205 using, for example, the client-server interface 255.

If the parameter is outside the predetermined range, step 445 may include providing feedback to the estimator module 230 so that the connectivity time may be adjusted accordingly. For example, if the parameters indicate low quality of service the estimator module 230 may increase the connectivity time until the parameters indicate that the quality of service is within the predetermined range.

Step 450 may include logging the parameters, including any discrepancy values (e.g., parameters outside the predetermined range) in, for example, the failure repository database 225. In one exemplary approach, the status manager module 240 may be configured to monitor the application server 205 using the client-server interface 255, and log successful and failed connections to the application server 205. A successful connection attempt may be logged when the user device 105 connects to the application server 205 within the connectivity time. Likewise, a failed connection attempt may be logged when the user device 105 fails to connect to the application server 205 within the connectivity time. The service failure analyzer module 250 may be configured to log failed connectivity attempts and transmit the flow record documenting the failed attempt to the failure repository database 215. The service failure analyzer module 250 may further be configured to identify a cause of the failed connectivity attempt and communicate the cause of the failed connectivity attempt to the estimator module 230. Therefore, the estimator module 230 may use previously failed connectivity attempts when estimating connectivity time. In addition, the estimator module 230 may access the failure repository database 225 to retrieve the flow records of failed connection attempts. Furthermore, the counter module 245 may be in communication with the status manager module 240 to count the number of failed connection attempts and communicate the number of failed connection attempts to the manager module 235. The estimator module 230 may use the number of failed connection attempts when predicting future network behavior. For example, the estimator module 230 may compare the parameters to the number of failed connection attempts when like parameters were received from the network elements 110 during previous connection attempts.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

It is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising:
a user device configured to communicate with an application server over a network;
a plurality of network elements in communication with one another over the network, each of said plurality of network elements having at least one parameter representative of network behavior; and
an adaptive server in communication with said user device and at least one of said network elements, said adaptive server configured to estimate a connectivity time for establishing a connection between said user device and the application server, wherein the connectivity time is based on the at least one parameter and wherein said adaptive server is configured to transmit the estimated connectivity time to the application server with an instruction for the application server to allow said user device at least the estimated connectivity time to establish the connection with the application server.

2. A system as set forth in claim 1, wherein said adaptive server includes an estimator module configured to receive the at least one parameter from at least one of said plurality of network elements and estimate the connectivity time based on the at least one parameter.

3. A system as set forth in claim 2, wherein said adaptive server includes a manager module configured to prioritize connections to the application server based on the estimated connectivity time received from said estimator module.

4. A system as set forth in claim 2, wherein said adaptive server includes a status manager module configured to log successful and failed connections to the application server.

5. A system as set forth in claim 4, wherein said adaptive server includes a service failure analyzer module configured to log a failed connectivity attempt and identify a cause of the failed connectivity attempt.

6. A system as set forth in claim 5, wherein said estimator module is configured to estimate the connectivity time based at least in part on the cause of the failed connectivity attempt identified by said service failure analyzer module.

7. A system as set forth in claim 5, further comprising a failure repository database configured to receive a record of the failed connectivity attempt logged by said service failure analyzer module.

8. A system as set forth in claim 2, wherein said adaptive server includes a performance categorizer module configured to receive said at least one parameter of said at least one of said plurality of network elements.

9. An apparatus comprising:
a computing device including a non-transitory computer-readable medium embodying computer-executable instructions configured to implement:
an estimator module in communication with at least one of a plurality of network elements and configured to receive at least one parameter from the at least one of the plurality of network elements and to estimate a connectivity time for establishing a connection with an application server, wherein the connectivity time is based on the at least one parameter; and
a manager module in communication with said estimator module and configured to prioritize connections to the application server based on the estimated connectivity time received from said estimator module,
wherein the computing device is configured to transmit the estimated connectivity time to the application server with an instruction for the application server to allow at least the estimated connectivity time to establish the connection with the application server.

10. An apparatus as set forth in claim 9, further comprising a status manager module configured to log successful and failed connections to the application server.

11. An apparatus as set forth in claim 9, further comprising a service failure analyzer module configured to log a failed connectivity attempt and identify a cause of the failed connectivity attempt.

12. An apparatus as set forth in claim 11, wherein said estimator module is configured to estimate the connectivity time based at least in part on the cause of the failed connectivity attempt identified by said service failure analyzer module.

13. An apparatus as set forth in claim 9, further comprising a performance categorizer module configured to receive the at least one parameter of the at least one of the plurality of network elements.

14. A method comprising:
receiving at least one parameter of at least one of a plurality of network elements at an adaptive server, wherein the at least one parameter is indicative of network behavior;
estimating a connectivity time for establishing a connection between a user device and an application server with the adaptive server based on the network behavior; and
transmitting the estimated connectivity time to the application server with an instruction for the application server to allow the user device at least the estimated connectivity time to establish the connection with the application server.

15. A method as set forth in claim 14, further comprising estimating the connectivity time based on the at least one parameter received from the at least one of the plurality of network elements.

16. A method as set forth in claim 15, further comprising prioritizing connections to the application server based on the estimated connectivity time.

17. A method as set forth in claim 14, further comprising logging at least one failed connection to the application server.

18. A method as set forth in claim 17, further comprising identifying the cause of the failed connection to the application server.

19. A method as set forth in claim 18, wherein estimating the connectivity time includes estimating the connectivity time based at least in part on the cause of the failed connection to the application server.

20. A method as set forth in claim 19, further comprising transmitting a record of the failed connection to a failure repository database.

21. A non-transitory computer-readable medium tangibly embodying computer-executable instructions comprising:
receiving at least one parameter of at least one of a plurality of network elements at an adaptive server, wherein the at least one parameter is indicative of network behavior;
estimating a connectivity time between a user device and an application server with the adaptive server based on the network behavior; and
transmitting the estimated connectivity time to the application server with an instruction for the application server to allow the user device at least the estimated connectivity time to establish a connection with the application server.

22. A computer-readable medium as set forth in claim 21, further comprising estimating the connectivity time based on the at least one parameter received from the at least one of the plurality of network elements.

23. A computer-readable medium as set forth in claim 22, further comprising prioritizing connections to the application server based on the estimated connectivity time.

24. A computer-readable medium as set forth in claim 21, further comprising logging at least one failed connection to the application server.

25. A computer-readable medium as set forth in claim 24, further comprising identifying the cause of the failed connection to the application server.

26. A computer-readable medium as set forth in claim 25, wherein estimating the connectivity time includes estimating the connectivity time based at least in part on the cause of the failed connection to the application server.

27. A computer-readable medium as set forth in claim 26, further comprising transmitting a record of the failed connection to a failure repository database.

28. A system as set forth in claim 1, wherein the adaptive server is configured to receive a timeout error from the application server after the estimated connectivity time has elapsed, and wherein the adaptive server is configured to adjust the estimated connectivity time.

29. A system as set forth in claim 28, wherein the adaptive server is configured to transmit the adjusted estimated connectivity time to the application server with an instruction for the application server to allow said user device at least the adjusted estimated connectivity time to establish the connection with the application server.

* * * * *